(12) United States Patent
Braman et al.

(10) Patent No.: US 7,404,324 B2
(45) Date of Patent: Jul. 29, 2008

(54) GUNHARD SHOCK ISOLATION SYSTEM

(75) Inventors: Todd L. Braman, New Brighton, MN (US); Owen Grossman, Golden Valley, MN (US); Erik J. Hovland, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 326 days.

(21) Appl. No.: 11/161,878

(22) Filed: Aug. 19, 2005

(65) Prior Publication Data

US 2007/0074570 A1    Apr. 5, 2007

(51) Int. Cl.
*G01P 1/02* (2006.01)
*F16F 7/10* (2006.01)

(52) U.S. Cl. .............................. 73/493; 73/431; 188/378

(58) Field of Classification Search .................... 73/493, 73/431, 504.04, 504.12, 514.01, 514.16, 73/514.18; 188/378–380
See application file for complete search history.

(56) References Cited

U.S. PATENT DOCUMENTS

| | | | |
|---|---|---|---|
| 2,393,071 A | 1/1946 | Schaelchlin | |
| 2,919,882 A | 1/1960 | Barkalow | |
| 3,167,294 A | 1/1965 | Andrews et al. | |
| 3,714,831 A | 2/1973 | Quichaud et al. | |
| 4,066,058 A | 1/1978 | Anderkay | |
| 4,178,811 A | 12/1979 | Shepherd | |
| 4,395,809 A | 8/1983 | Whiteley | |
| 4,487,402 A | 12/1984 | Takayanagi et al. | |
| 4,498,340 A * | 2/1985 | Duncan | 73/504.11 |
| 4,509,781 A | 4/1985 | Dick et al. | |
| 4,581,933 A | 4/1986 | Mansley | |
| 4,827,847 A | 5/1989 | Laviolette et al. | |
| 5,184,521 A | 2/1993 | Tyler | |
| 5,186,413 A | 2/1993 | Deakin | |
| 5,237,450 A | 8/1993 | Stromberg | |
| 5,348,267 A | 9/1994 | Lanting et al. | |
| 5,360,236 A | 11/1994 | Brown | |
| 5,366,200 A | 11/1994 | Scura | |
| 5,366,210 A | 11/1994 | Grunau et al. | |

(Continued)

FOREIGN PATENT DOCUMENTS

EP    1788277    *    5/2007

(Continued)

OTHER PUBLICATIONS

Karnick et al., "Honeywell Gun-Hard Inertial Measurement Unit (IMU) Development," Honeywell Defense & Space Electronics, DFOISR #04-S-0593, 7 pages, Prior to Aug. 19, 2005.

(Continued)

*Primary Examiner*—Helen C. Kwok
(74) *Attorney, Agent, or Firm*—Fogg & Powers LLC (57) ABSTRACT

An inertial measurement unit (IMU) is provided that includes a container that defines a cavity. A sensor suit or ISA having a housing is provided in the container of the IMU. A dampening material is provided between the housing of the ISA and the container of the IMU. The dampening material may be applied by coating, spraying, or dipping, or may be separately molded and then inserted, if desired. A sway space may also be provided between the ISA and the IMU container.

23 Claims, 7 Drawing Sheets

U.S. PATENT DOCUMENTS

| | | |
|---|---|---|
| 5,389,746 A | 2/1995 | Moody |
| 5,474,999 A | 12/1995 | Russell et al. |
| 5,878,980 A | 3/1999 | Cooley, Jr. |
| 5,890,569 A * | 4/1999 | Goepfert .................... 188/378 |
| 5,890,659 A | 4/1999 | Schoeffel et al. |
| 5,927,680 A | 7/1999 | Bridges et al. |
| 5,932,836 A | 8/1999 | White |
| 6,113,030 A | 9/2000 | Law et al. |
| 6,191,521 B1 | 2/2001 | Fell et al. |
| 6,202,961 B1 | 3/2001 | Wilke et al. |
| 6,257,057 B1 * | 7/2001 | Hulsing, II ............... 73/504.04 |
| 6,371,073 B1 | 4/2002 | Billimack et al. |
| 6,578,682 B2 * | 6/2003 | Braman et al. ............. 188/378 |
| 6,629,669 B2 | 10/2003 | Jensen |
| 6,701,786 B2 * | 3/2004 | Hulsing, II ............... 73/514.02 |
| 2002/0190156 A1 | 12/2002 | Jensen |
| 2004/0150144 A1 * | 8/2004 | Goepfert et al. ............ 267/136 |

FOREIGN PATENT DOCUMENTS

| | | |
|---|---|---|
| GB | 470545 | 8/1937 |
| JP | 0917486 | 7/1997 |
| WO | 9855832 | 12/1998 |
| WO | 03029756 | 4/2003 |
| WO | 2005001385 | 1/2005 |

OTHER PUBLICATIONS

PCT, "PCT International Search Report", Dec. 4, 2007, Published in: WO.

* cited by examiner

GUNHARD SHOCK ISOLATION SYSTEM

This invention was made with government support under the ARDEC (Common Guidance) Program contract number DAAE30-01-9-0100. The U.S. government may have certain rights in the invention.

FIELD

The present invention relates generally to inertial measurement units (IMUs), and more particularly, to methods and systems for dampened mechanical shocks in IMUs under high G events.

BACKGROUND

In certain environments, it may be necessary to isolate mechanically sensitive assemblies from shock, vibrational, and acoustic energy. In many applications, this may be accomplished by placing the sensitive components within some form of container or housing. The need to isolate a device from shock, vibrational, and/or acoustic energy may be particularly acute when the device is an inertial sensor assembly (ISA), which may include a sensor suite of an inertial measurement unit (IMU). An ISA typically includes inertial sensors that detect acceleration and/or rotation in three axes. Usually, three accelerometers and three rotational rate sensors are arranged with their input axes in a perpendicular relationship. The sensors may generally be rigidly and precisely mounted within an ISA housing along with related electronics and hardware. Commonly, the housing of the ISA may be mounted to a container of the IMU, and the IMU may be rigidly and precisely mounted to a frame of a vehicle, such as an aircraft, missile, or other object.

Some applications expose the IMU to extremely high dynamic environments, such as ballistic applications wherein a projectile may be fired from a gun. Traditionally, the inertial sensors were protected to some degree from relatively low level shock and vibration through the use of vibration isolators. However, such vibration isolators often do not protect the inertial sensors form higher vibration and shock levels that are often present in many high dynamic environments. Therefore, it may be desirable to provide a mechanism to attenuate energy transfer to the inertial sensors in relatively high shock and vibration environments, particularly in ballistic and other high dynamic applications, to increase the performance of the inertial sensor system.

SUMMARY

The following summary of the invention is provided to facilitate an understanding of some of the innovative features unique to the present invention and is not intended to be a full description. A full appreciation of the invention can be gained by taking the entire specification, claims, drawings, and abstract as a whole.

The present invention relates generally to IMUs and more particularly to methods and systems for dampened mechanical shock in IMUs under high G events. In one illustrative embodiment, an inertial measurement unit (IMU) is provided that includes a container that defines a cavity. A sensor suit or ISA having a housing is provided in the container of the IMU. A dampening material is provided between the housing of the ISA and the container of the IMU. The dampening material may be applied by coating, spraying, or dipping, or may be separately molded and then inserted, if desired. A sway space may also be provided between the ISA and the IMU container.

BRIEF DESCRIPTION

DETAILED DESCRIPTION

The following description should be read with reference to the drawings wherein like reference numerals indicate like elements throughout the several views. The detailed description and drawings show several embodiments which are meant to be illustrative of the claimed invention.

Figure 1:
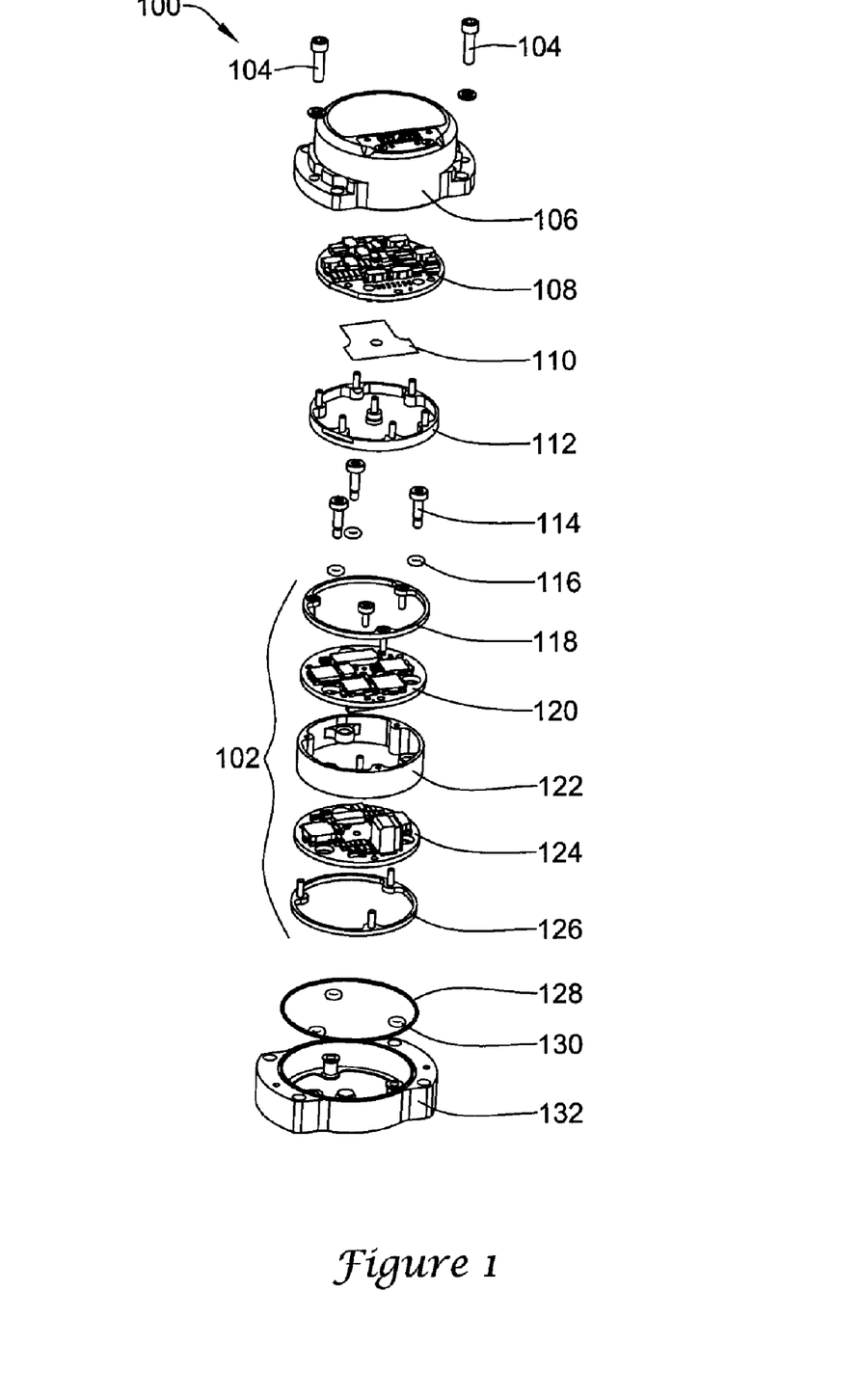
FIG. 1 is a perspective assembly view of an illustrative inertial measurement unit in accordance with the present invention.

FIG. 1 is a perspective assembly view of an illustrative inertial measurement unit (IMU) 100 in accordance with the present invention. The illustrative IMU 100 includes a container, which has a cover member 106 and a base member 132 forming a cavity there between. The cover member 106 and base member 132 may be secured together using one or more fasteners, such as, for example, bolts 104. The illustrative embodiment may also include an o-ring seal or gasket 128 situated between the cover member 106 and the base member 132. The container may be used to help mechanically isolate a sensor suite 102 from shock, vibration, and acoustic energy. In some embodiments, the container is inserted and secured to a ballistic shell, which can be shot from a gun.

The sensor suite 102, such as, for example, an inertial sensor assembly (ISA) 102, may measure acceleration and/or rotation in three planes and may be situated in the cavity of the container. The illustrative sensor suite 102 includes two printed wiring assemblies (PWA) 120 and 124 having components or sensor situated thereon. In some cases, the components or sensor may be MEMS sensors or MEMS components as desired. A first PWA 124 may include one or more gyros situated thereon, and a second PWA 120 may include one or more accelerometers situated thereon. However, it is contemplated that any number of PWAs 120 and 124 with any type of sensors or other components situated thereon may be included in the sensor suite 102, depending on the desired application.

The illustrative sensor suite 102, or in some cases inertial sensor assembly (ISA), may itself include a housing 122 sized to house the sensor suite PWAs 120 and 124. In some cases, the housing 122 may be a cluster mount, wherein the cluster of PWAs 120 and 124 and retaining rings 118 and 126 may be mounted therein. The illustrative PWAs 120 and 124 may be situated within the housing 122 to mechanically isolate the PWAs 120 and 124 from external shock and vibration.

The illustrative sensor suite 102 is shown having a first retaining ring 118 situated above the illustrative PWA 120 in the sensor suite 102, and a second retaining ring 126 situated below the illustrative PWA 124 in the sensor suite 102. The illustrative retaining rings 118 and 126 may help secure the PWAs 120 and 124 within the housing 122 of the sensor suite 102.

The illustrative sensor suite 102 may be secured to the base member 132 with at least one fastener 114. In the illustrative embodiment, the at least one fastener 114 includes three bolts or screws. However, any fastener 114 may be used as desired. In some cases, the illustrative fastener 114 may have at least one isolator, such as isolator 116 and 130, situated on the fastener 114 above and/or below the illustrative sensor suite 102. In some cases, at least one isolator 116 and 130 may be an o-ring sized to fit around the fastener 114. However, any suitable isolator 116 and 130 may be used as desired. In some cases, at least one isolator 116 and 130 may be a soft material, such as vulcanized rubber, that may deform and attenuate shock and/or vibration. In another cases, at least one isolator 116 and 130 may be a relatively harder material that may not significantly deform during a shock event. More generally, the at least one isolator 116 and 130 may be any type of isolator, as desired.

Figure 4:
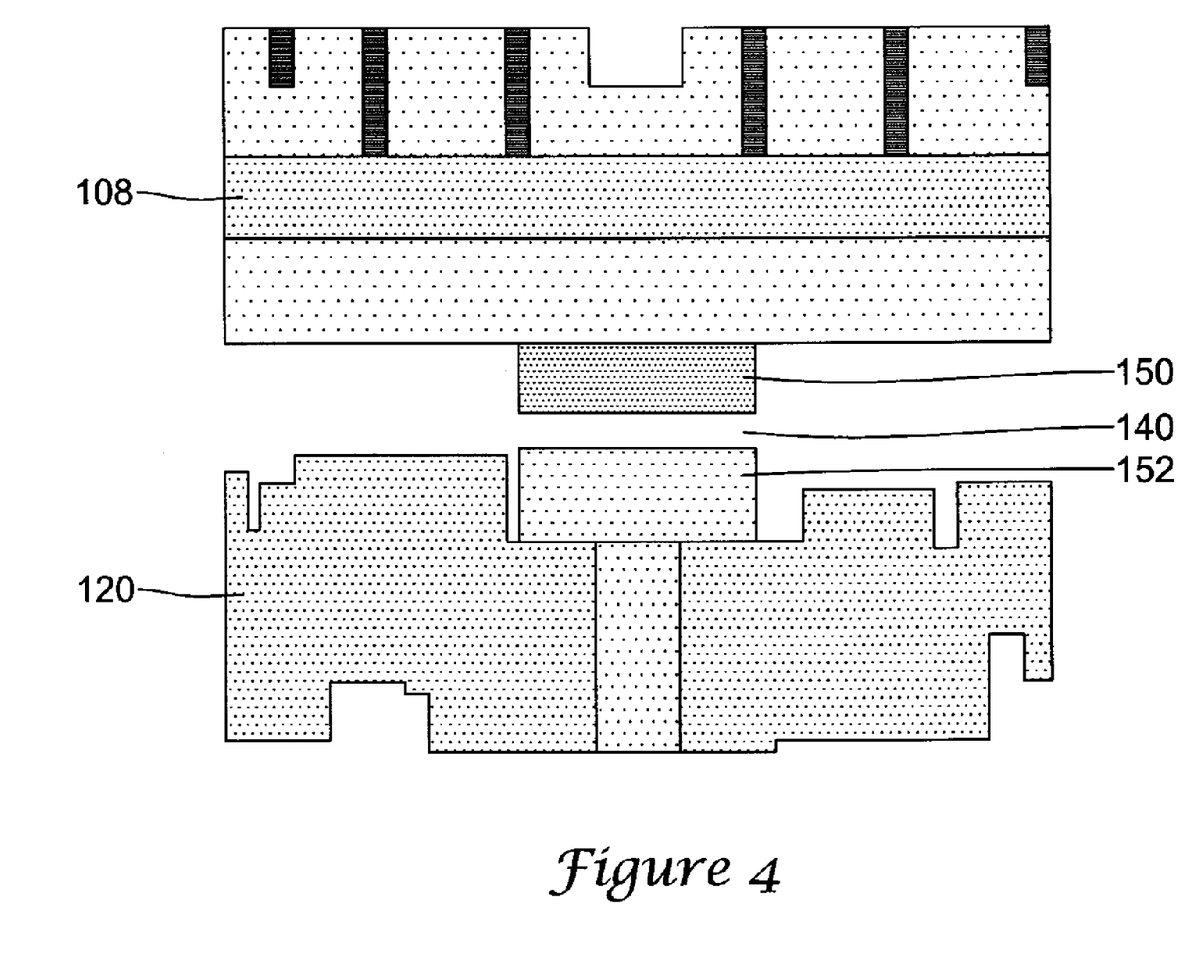
FIG. 4 is a schematic diagram of an illustrative sway space.
Figure 5:
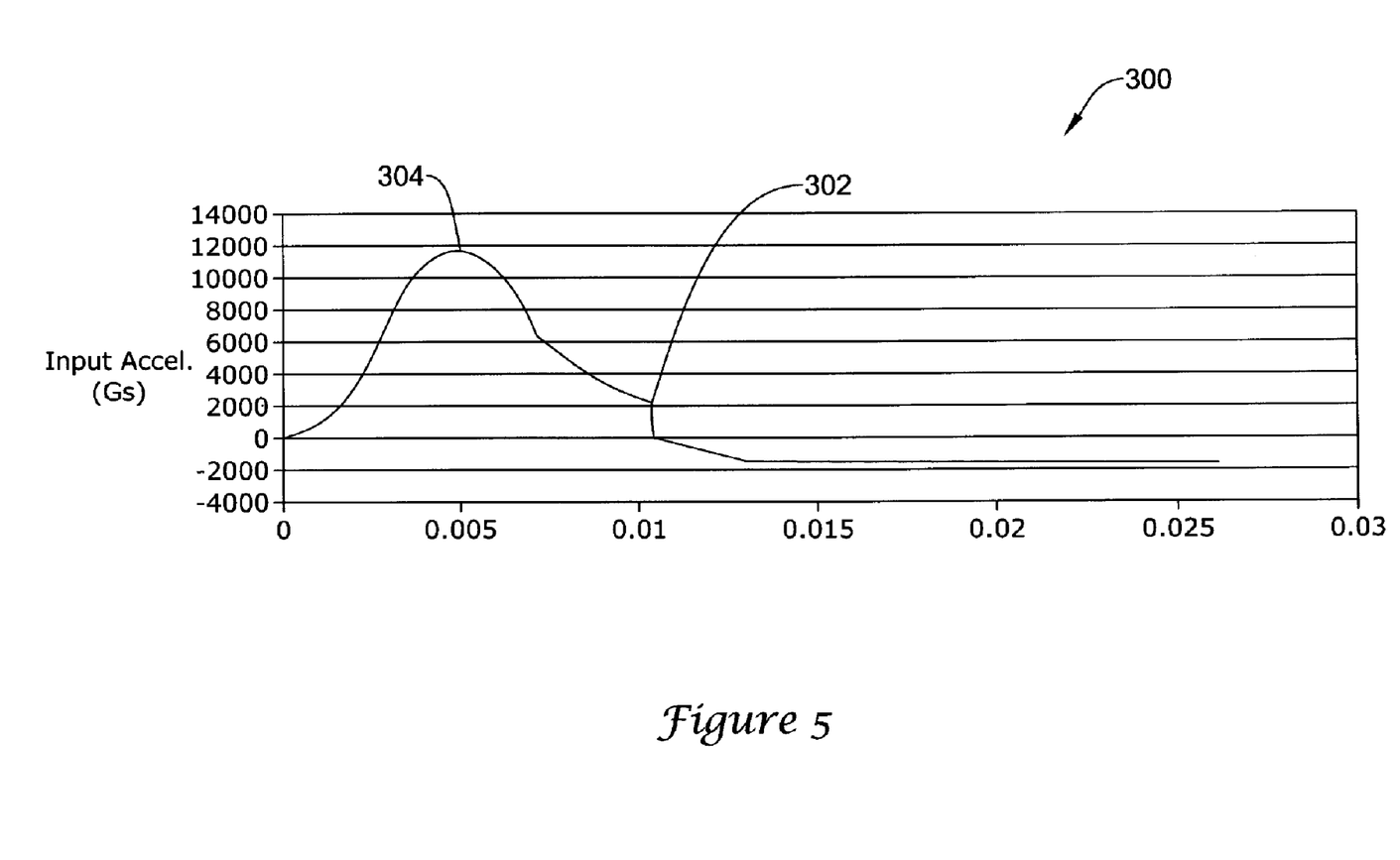
FIG. 5 is a graph of an illustrative shock input.

In the illustrative embodiment, the at least one isolator 116 and 130 may provide sway space between the sensor suite 102 and the base member 132, and between the sensor suite 102 and any device situated above the sensor suite 102, as further illustrated in FIGS. 4 and 5.

In some cases, another PWA 108 may be provided above the sensor suite 102. The illustrative additional PWA 108 may be a PWA with a processor situated thereon. The processor may provide electronic circuitry and control for the IMU 100. It is contemplated that any number of additional PWAs 108 may be used, including no additional PWAs, as desired.

In some cases, there may be another retaining ring 112 situated next to the additional PWA 108. Retaining ring 112 may help secure the additional PWA 108 to the cover member 106 of the container. In some cases, there may be a flextape assembly 110 situated between the ISA 102 and the additional PWA 108. The flextape assembly 110 may help form an electrical connection between the additional PWA 108 and the sensor suite 102.

The illustrative IMU 100 may provide inertial data, such as linear and angular acceleration information, about the movement of the IMU 100. The data may provide information relating to the flight and control of the IMU 100 to a navigational computer. In some cases, the IMU 100 may provide guidance information about the flight of a projectile. In other cases, the IMU 100 may provide information relating to the flight of an aircraft. More generally, the IMU 100 may be used to provide data relating to any movable object, as desired.

Figure 2:
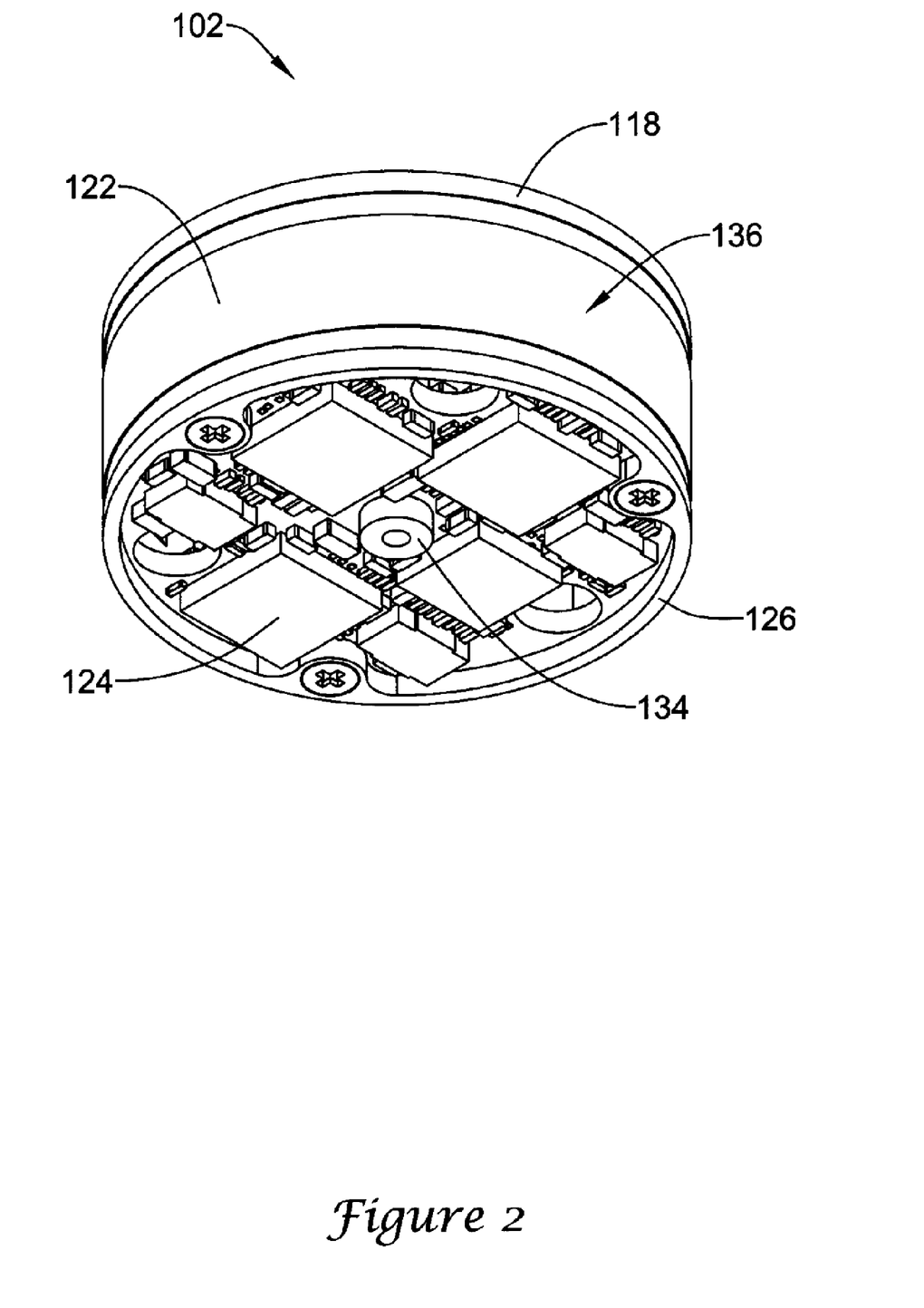
FIG. 2 is a perspective view of an illustrative embodiment of the sensor suite (ISA) 102 of FIG. 1, in a partial assembled state.

FIG. 2 is a perspective view of an illustrative embodiment of the sensor suite (ISA) 102 of FIG. 1, in a partial assembled state. As indicated above, the ISA 102 may include housing 122. In one illustrative embodiment, the housing 122 may include a dampening material 136 applied to the outer surface of the housing 122. Also, the housing 122 may have one or more PWAs 124 situated therein. Furthermore, in some cases, the ISA 102 may include one or more retaining rings 118 and 126. The illustrative retaining rings 118 and 126 may include dampening material 136. The dampening material 136 may be situated on a portion of the outer side surface, a portion of the top surface, and/or a portion of the bottom surface of the retaining rings 118 and 126. More generally, the dampening material 136 may be situated on any portion of the retaining rings 118 and 126, as desired.

Additionally, the illustrative ISA 102 may include one or more supports 134 situated within the housing 122. In some cases, the one or more supports 134 may extend above the ISA 102 and/or below the ISA 102. The one or more supports 134 may include, for example, a center support and/or one or more support rings. The one or more support rings may correspond to the retaining rings 118 and 126 as discussed previously. In some cases, a dampening material 136 may also be applied to at least one of the one or more supports 134 of the ISA 102, particularly if the support can engage an adjacent part of the IMU such as the base member 132 during a high G event. More generally, it is contemplated that a dampening material 136 may be applied to any portion of any component or part of the ISA 102 that may engage an adjacent part of the IMU during a high G event.

The dampening material 136 may be provided to help attenuate shock and/or vibration at the ISA 102. For some applications, such in a gun launch, the shock and vibration may affect the performance of the sensors in the ISA 102. In some cases, the dampening material 136 may be applied to the outer surface of the housing 122 so that during impacts (e.g. side impacts of the projectile with the wall of a barrel of a gun), the dampening material 136 may temporarily deform and attenuate the shock and/or vibration before the shock and/or vibration reaches the suite of sensors in the ISA 102. The temporary deformation may help minimize the deceleration of the ISA 102 at impact, thereby attenuating the shock and/or vibration at the inertial sensors.

Additionally, due to the dynamics of a gun launch, as well as the dynamic in other high G environments, there may be impacts in all directions. So, in some cases, the dampening material 136 may be applied around all sides of the ISA 102, or portions thereof. When so provided, the dampening material 136 may provide multiple direction attenuation. In some cases, the illustrative dampening material 136 may help an IMU endure 20,000 or more G's of acceleration/deceleration.

In the illustrative embodiment, the dampening material 136 may be rubber, such as vulcanized rubber. However, it is contemplated that any material that may absorb energy or that may cushion the impact may be used, as desired. In some cases, the rubber may be a silicone rubber. One advantage of silicone rubber is its properties are relatively consistent over a broad range of temperatures. In one case, the dampening material 136 may be silicone paint. The illustrative dampening material 136 may have a thickness in the range of 0.004 to 0.014 inches, or more or less, as desired.

One illustrative method of dampening the IMU may include providing an ISA 102 in the IMU and applying the dampening material 136 to the outer surface of the ISA 102. Alternatively, the dampening material may be applied to an inner surface of the IMU housing. It is contemplated that the dampening material 136 may be applied by spraying, coating, dipping, or by any other suitable method, onto the outer surface of the ISA 102, or any other part of the IMU as desired to help attenuate shock and/or vibration at the ISA 102. The dampening material 136 may be applied to have a thickness in the range of 0.004 inches to 0.0014 inches. However, this is only an example, and it is contemplated that the thickness of the dampening material 136 may be any desired thickness.

In some embodiments, the dampening material 136 may be applied to the outer surface of the ISA by molding the dampening material 136 over the ISA 102. The dampening material 136 may be molded to have a thickness in the range of 0.010 inches to 0.030 inches, or more or less, as desired. In yet another case, the dampening material 136 may be applied by assembling a preformed dampening element 136 onto the ISA 102. In one case, a dampening element 136 may be preformed and assembled or otherwise provided onto the outer surface of the ISA 102. The thickness of the dampening material 136 may be any thickness as desired. More generally, the dampening material 136 may be applied according to any suitable method and to any desired thickness depending on the application at hand.

Additionally or alternatively, and as noted above, it is contemplated that the dampening material 136 may be provided to the inner surface of the IMU 100, particularly a portion of the inner surface positioned adjacent to the ISA 102. The dampening material 136 may be applied to the inner surface of the IMU 100 by the same methods discussed above.

It is further contemplated that the dampening material 136 may also be applied to other regions of the ISA 102. In some cases, the dampening material 136 may be applied to the ends of the upper and lower center supports 134 of the ISA 102, the upper and/or lower support rings 118 and 124 situated around the ISA 102, and/or the base 132, cover 106, and processor PWA 108 support parts. More generally, the dampening material 136 may be applied to any part of the IMU, in whole or in part, as desired, to help attenuate shock and/or vibration at the sensor suite in the ISA 102.

Figure 3:
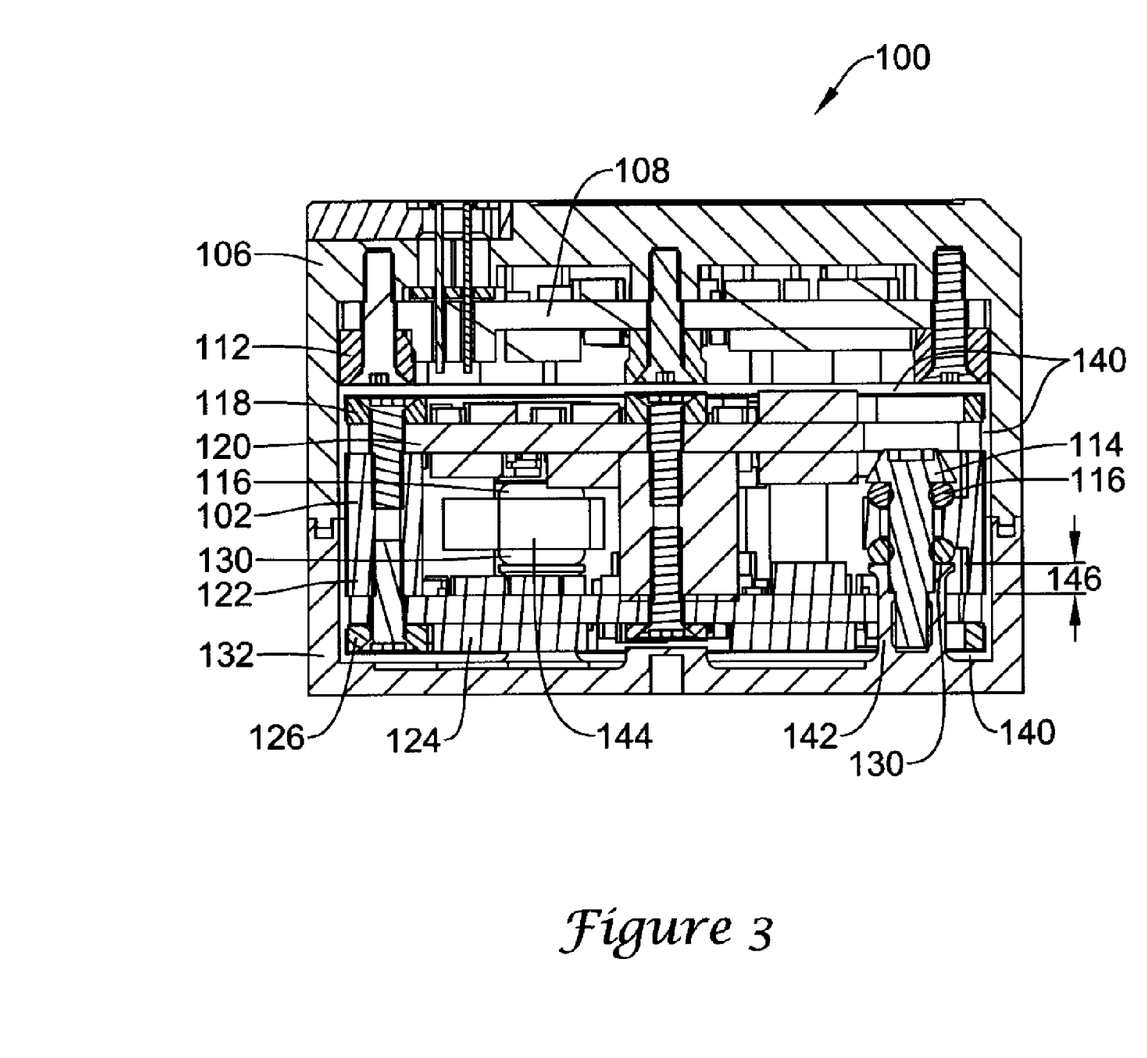
FIG. 3 is a schematic diagram of an illustrative embodiment of a cross section of an IMU having an illustrative sway space.

FIG. 3 is a cross-sectional view of an illustrative embodiment of an IMU 100 having an illustrative sway space 140. The illustrative sway space 140 may provide space between the sensor suite 102 and the surrounding components and/or housings. In the illustrative embodiment, the sway space 140 may be in the range of 0.005 inches to 0.050 inches, or more or less. In some cases, there is an upper sway space above the ISA 102 and a lower sway space below the ISA. In one illustrative embodiment, the upper sway space may be about 0.03 inches, and the lower sway space may be about 0.025 inches.

The sway space is sometimes desirable to help provide isolation (e.g. via the o-rings 116) of the ISA 102 during normal operation (e.g. during flight) of the ISA. However, the sway space may also allow the sensor suite in the ISA 102 to move during a high G event, and in many cases, impact with either the base member 132 or the cover member 106. Such an impact often amplifies the acceleration/deceleration of the sensor suite during the high G event. However, in accordance with an illustrative embodiment of the present invention, the dampening material (discussed above) may help attenuate the shock and/or vibration that is transferred to the ISA 102 during such an impact (e.g. at gun launch). The sway space 140 gap is preferably large enough to allow for proper isolation of the ISA 102 during normal operation of the ISA (e.g. during flight of the projectile), but small enough to minimize the differential velocity of the ISA 102 relative to the IMU 100 housing during a gun launch, particularly if/when an impact occurs. The sway space is also preferably small enough to not allow over compression of the isolation system (e.g. o-rings 116) during a gun launch.

The illustrative IMU 100 shown in FIG. 3 includes the ISA 102, the container for housing the ISA 102, and a sway space 140 situated between the ISA 102 and the container. The illustrative IMU 100 further includes one or more upper o-rings 116 and one or more lower o-rings 130, wherein the one or more upper o-rings 116 and the one or more lower o-rings 130 may control the sway space 140 between the ISA 102 and the container. There may also be one or more bolts 114 to secure the o-rings 116 and 130 between the ISA 102 and the container. As indicated above, the container may have a base member 132 and a cover member 106. The illustrative sway space 140 may include a space between the ISA 102 and the IMU 100 container.

The illustrative base member 132 may have a base post 142. The base post 142 may be defined to receive one end of the bolt 114 or fastener to secure the ISA 102 in a position. The one or more upper o-rings 116 and the one or more lower o-rings 130 may hold the ISA away from the IMU container to provide the desired sway space 140. The illustrative base member 132 and the illustrative cover member 106 may form a cavity. Situated in the cover member 132 may be the PWA 108 with the processor. There may also be a retaining ring 112 situated next to the PWA 108 to secure the PWA 108 to the cover member 106. The illustrative retaining ring 112 may have a screw to secure the retaining ring 112 and the PWA 108 to the cover member 106.

The illustrative ISA 102 may have two PWAs 120 and 124 situated within the housing 122. One illustrative PWA 124 may have one or more gyros situated thereon, and the other PWA 120 may have one or more accelerometers situated thereon. There may also be a retaining ring 118 situated on the top surface of the housing 122 and another retaining ring 126 situated on the bottom of the housing 122.

As noted above, the illustrative IMU 100 includes one or more o-rings, or isolators, 116 and 130. One of the isolators 130 may be situated on the base post 142, and may be recessed into the ISA 102 by a distance 146. Another isolator 130 may be held in place by an isolator holder 144 situated in the ISA 102. More generally, the illustrative IMU 100 may include any suitable components to provide any desired sway space 140.

FIG. 4 is a schematic diagram of the illustrative upper sway space 140. The illustrative upper sway space 140 is situated between a washer 150 for the processor PWA 108 and a washer 152 for the accelerometer PWA 120. The processor PWA 108 may be situated above the washer 150 for the processor PWA 108 and the accelerometer PWA 120 may be situated below the washer 152 for the accelerometer PWA 120. The washer 150 and/or washer 152 may, in some cases, be formed from or include a coating of a dampening material, if desired.

FIG. 5 is a graph of an illustrative shock event. The illustrative shock event has a peak shock of about 12,000 G's, as shown at 304. This illustrative shock event may be similar to that of a gun shot and illustrates the acceleration of a projectile being fired out of the gun. At a time of about 0.001 seconds, as shown at 302, the projectile may leave the barrel of the gun. At point 302, the projectile may experience a deceleration pulse. When the projectile is in the barrel of the gun, there may be a large pressure differential between the front of the projectile and the rear of the projectile. As the projectile leaves the gun, the projectile may expand, because of a drop in pressure at the back of the projectile, resulting in the deceleration pulse 302. After leaving the barrel of the gun, the projectile may decelerate at a fairly constant rate. In some cases, it is the shock and vibration caused by these acceleration and deceleration pulses that the present invention may help attenuate.

Figure 6:
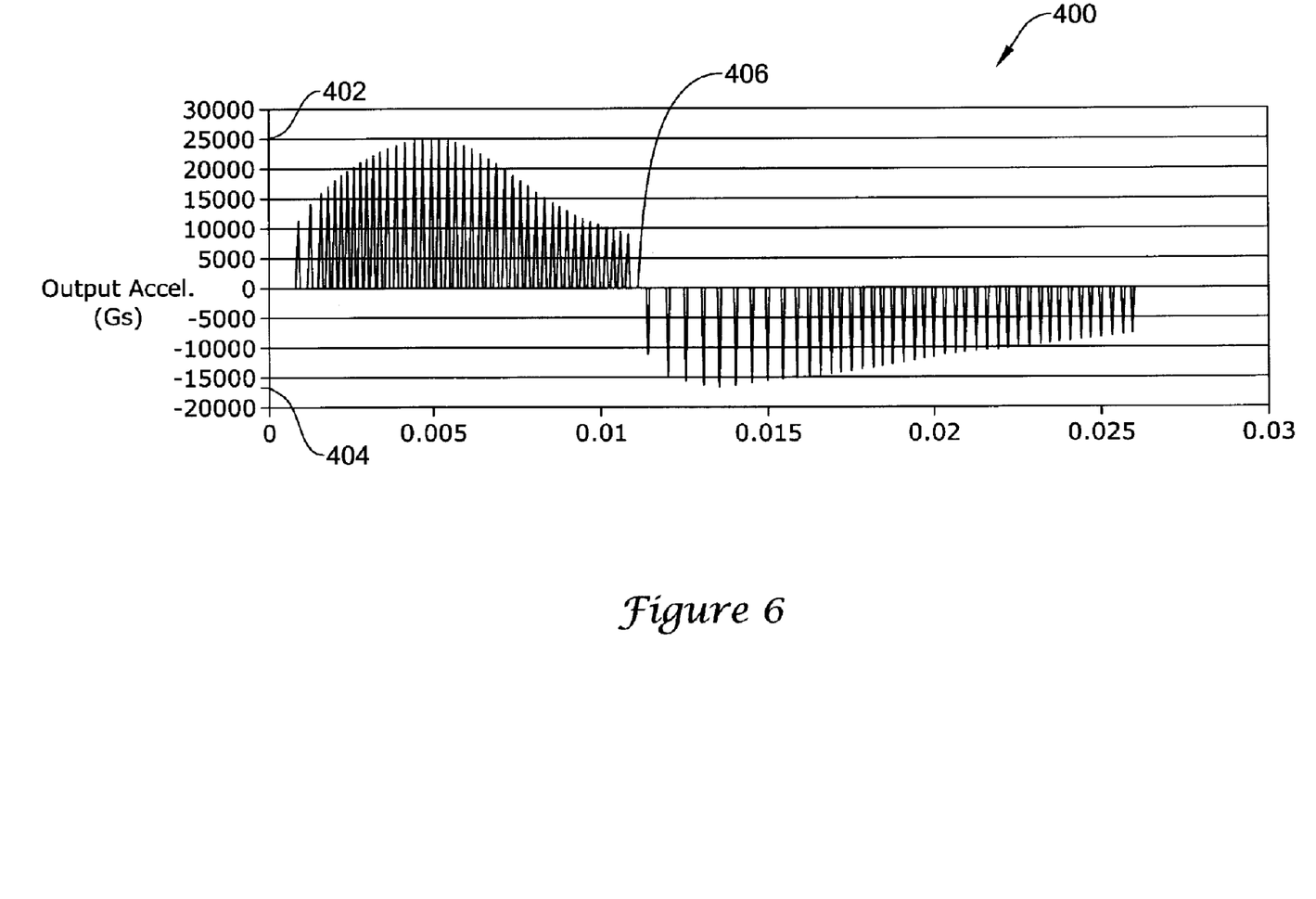
FIG. 6 is a graph of an illustrative ISA response with no dampening.

FIG. 6 is a graph of an illustrative ISA 102 response with no dampening, that is, with a metal-to-metal interface between the ISA and the IMU housing. The k value for an aluminum-to-aluminum contact is about 1,023,000. The acceleration of the ISA has a peak of about 25,000 G's, as shown at 402, during the dynamic event. After the illustrative ISA leaves the barrel of the gun, as shown at 406, the ISA experiences a deceleration with a peak of about 16,000 G's, as shown at 404.

Figure 7:
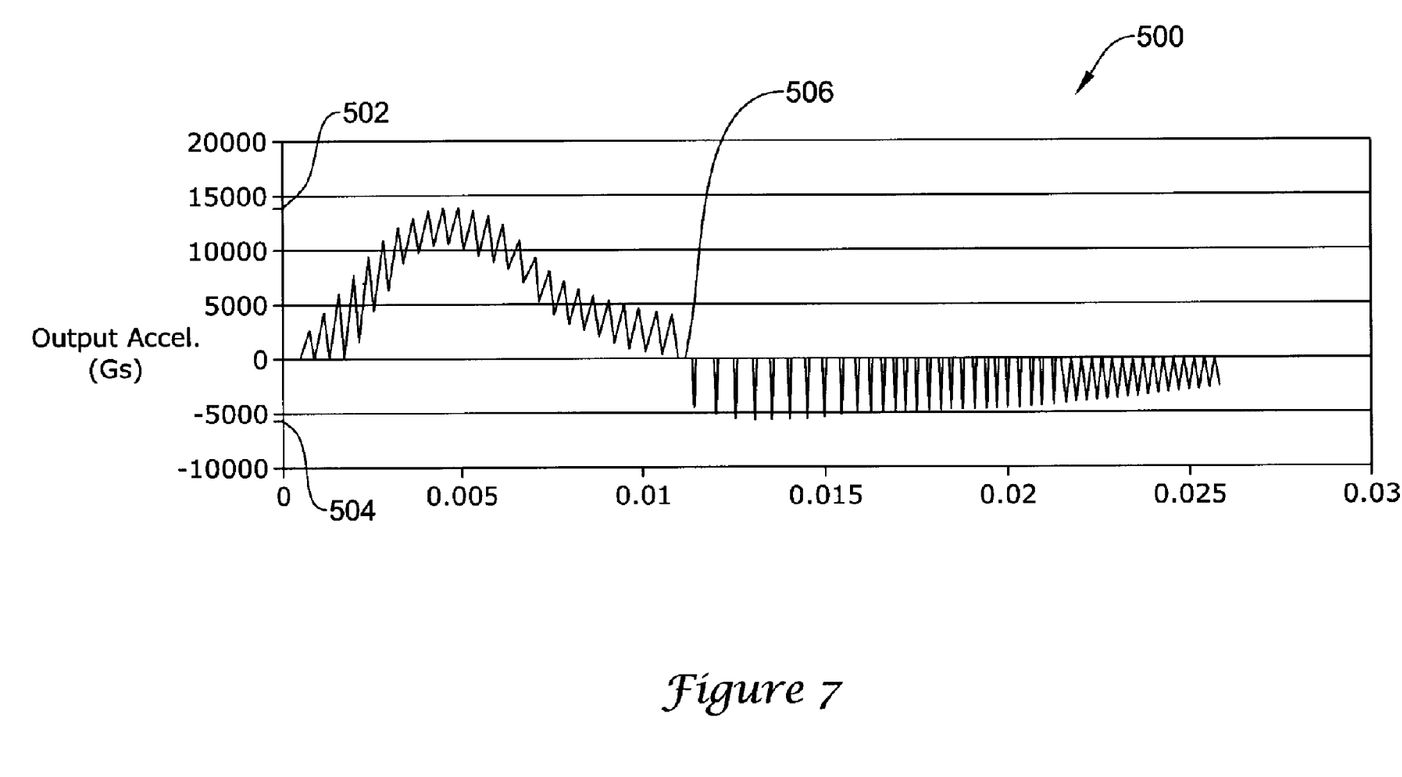
FIG. 7 is a graph of an illustrative ISA response with the dampening material applied to the outer surface of the ISA.

FIG. 7 is a graph of an illustrative ISA response with dampening material applied to the outer surface of the ISA housing 122. The graph is for an illustrative metal-to-rubber contact surface, which has a k value of about 100,000 (for a silicone-aluminum interface). The illustrative ISA response has a maximum acceleration of about 13,000 G's, as shown at 502. After the illustrative ISA 102 leaves the barrel of the gun, as shown at 506, the ISA experiences a maximum deceleration peak of about 7,000 G's, as shown at 504. As can be seen, the dampening material significantly attenuates the shock of the dynamic event by about a factor of two. The illustrative shock attenuation may be dependant on the type of dampening material used and the thickness in which the dampening material is applied.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

What is claimed is:

1. An inertial measurement unit (IMU) comprising:
   a container;
   a sensor suite having a housing with at least one inertial sensor;
   at least one isolator coupled between the container and the sensor suite, wherein the at least one isolator provides sway space between the sensor suite and the container; and
   a dampening material applied to at least a portion of the housing.

2. The IMU of claim 1 wherein the housing has an outer surface and the dampening material is applied to at least a portion of the outer surface of the housing.

3. The IMU of claim 1 wherein at least one MEMS inertial sensor is included on a printed wiring assembly (PWA) of the sensor suite.

4. The IMU of claim 1 wherein the sensor suite has at least one retaining ring for retaining the PWA within the housing, wherein at least a portion of the retaining ring has the dampening material applied thereto.

5. The IMU of claim 1 further comprising one or more supports for supporting the PWA within the housing, wherein the dampening material is applied to at least a portion of at least one of the one or more supports.

6. The IMU of claim 1 wherein the dampening material is rubber.

7. The IMU of claim 6 wherein the rubber has a thickness of at least 0.002 inches.

8. An inertial measurement unit (IMU) comprising:
   an IMU container having a cavity with cavity defining walls;
   a sensor suite having a housing with outer walls, the housing having at least one inertial sensor therein and separated from the IMU container by sway space; and
   a dampening material provided between the outer walls of the housing and the cavity defining walls of the IMU container, wherein the dampening material attenuates external forces experienced at the sensor suite as the sensor suite reduces the sway space and engages an adjacent portion of the IMU container during a high impact event.

9. The IMU of claim 8 wherein the dampening material is applied to at least a portion of the outer walls of the housing of the sensor suite.

10. The IMU of claim 8 wherein the dampening material is applied to at least a portion of the cavity defining walls of the IMU container.

11. The IMU of claim 8 wherein the dampening material is applied to at least a portion of the outer walls of the housing and to at least a portion of the cavity defining walls of the IMU container.

12. An inertial measurement unit (IMU) comprising:
    a container having a cavity there between;
    a sensor suite situated inside the cavity of the container; and
    a sway space situated between at least a portion of the sensor suite and at least a portion of the container.

13. The IMU of claim 12 wherein the sway space is in the range of 0.001 inches to 0.3 inches.

14. The IMU of claim 12 wherein the sensor suite includes a housing with an outer surface, and wherein a dampening material is applied to at least a portion of the outer surface of the housing.

15. The IMU of claim 14 wherein the dampening material is rubber.

16. The IMU of claim 12 farther comprising:
    one or more upper o-rings; and
    one or more lower o-rings;
    wherein the one or more upper o-rings and the one or more lower o-rings help provide the sway space between the housing of the sensor suite and the container of the IMU.

17. The IMU of claim 12 farther comprising one or more bolts to secure the o-rings between a housing of the sensor suite and the container of the IMU.

18. A method of dampening an inertial measurement unit (IMU) having a container that defines a cavity, the method comprising:
    providing an inertial sensor assembly (ISA) in the cavity, the ISA having a housing with an outer surface;
    providing a sway space between the outer surface of the housing of the ISA and the container of the IMU to separate the housing of the ISA from the container of the IMU; and
    providing a dampening material between at least a portion of the outer surface of the housing of the ISA and the container of the IMU, wherein the dampening material attenuates external forces experienced at the sensor suite as the sensor suite substantially eliminates the sway space to engage an adjacent portion of the container of the IMU during a high impact event.

19. The method of claim 18 wherein the dampening material is provided by coating, spraying, or dipping the dampening material onto at least a portion of the outer surface of the housing of the ISA.

20. The method of claim 19 wherein the dampening material is applied with a thickness in the range of at least 0.002 inches.

21. The method of claim 18 wherein the dampening material is provided by molding the dampening material over at least a portion of the outer surface of the housing of the ISA.

22. The method of claim 21 wherein the dampening material is molded to a thickness of at least 0.010 inches.

23. The method of claim 18 wherein the dampening material is provided by assembling a dampening material element onto at least a portion of the outer surface of the housing of the ISA.

* * * * *